United States Patent [19]

Di Giacomo et al.

[11] Patent Number: 5,577,769
[45] Date of Patent: Nov. 26, 1996

[54] HYBRID INFLATOR FOR INFLATING AIR BAGS

[75] Inventors: Michael Di Giacomo, Warrenton; Robert S. Scheffee, Lorton; Charles D. Woods, Manassas; Stephen Gold, Warrenton, all of Va.

[73] Assignee: Atlantic Research Corporation, Gainesville, Va.

[21] Appl. No.: 489,876

[22] Filed: Jun. 13, 1995

[51] Int. Cl.⁶ .................................................. B60R 21/26
[52] U.S. Cl. ...................... 280/736; 280/737; 280/741
[58] Field of Search ................................ 280/736, 737, 280/741, 742; 222/3, 5; 102/530, 531, 202.14, 202; 422/164–167

[56] References Cited

U.S. PATENT DOCUMENTS

| | | | |
|---|---|---|---|
| 3,868,124 | 2/1975 | Johnson | 280/741 |
| 3,877,721 | 4/1975 | Brown | 280/736 |
| 5,028,422 | 1/1992 | Hamilton et al. | 280/736 |
| 5,263,740 | 11/1993 | Frey et al. | 280/737 |
| 5,280,951 | 1/1994 | Rizzi et al. | 280/741 X |
| 5,290,060 | 3/1994 | Smith | 280/737 |
| 5,330,730 | 7/1994 | Brede et al. | 422/305 |
| 5,344,186 | 9/1994 | Bergerson et al. | 280/741 |
| 5,348,344 | 9/1994 | Blumenthal et al. | 280/737 |
| 5,350,192 | 9/1994 | Blumenthal | 280/737 |

FOREIGN PATENT DOCUMENTS

| | | | |
|---|---|---|---|
| 0616927 | 9/1994 | European Pat. Off. | 280/736 |
| 2348835 | 6/1994 | WIPO | 280/741 |

*Primary Examiner*—Christopher P. Ellis
*Attorney, Agent, or Firm*—Lowe, Price, LeBlanc & Becker

[57] ABSTRACT

A hybrid inflator for inflating vehicle air bags includes a first pressure vessel containing a compressed gaseous fuel, and igniter assembly and a second pressure vessel containing a compressed inflator gas. In use, the compressed fuel gas is released into the compressed inflator gas vessel using an igniter assembly for ignition of the gaseous fuel. Ignition of the gaseous fuel in the second pressure vessel causes a pressure and temperature rise which ruptures a burst disk in the second pressure vessel for gas release and inflation of an air bag.

13 Claims, 1 Drawing Sheet

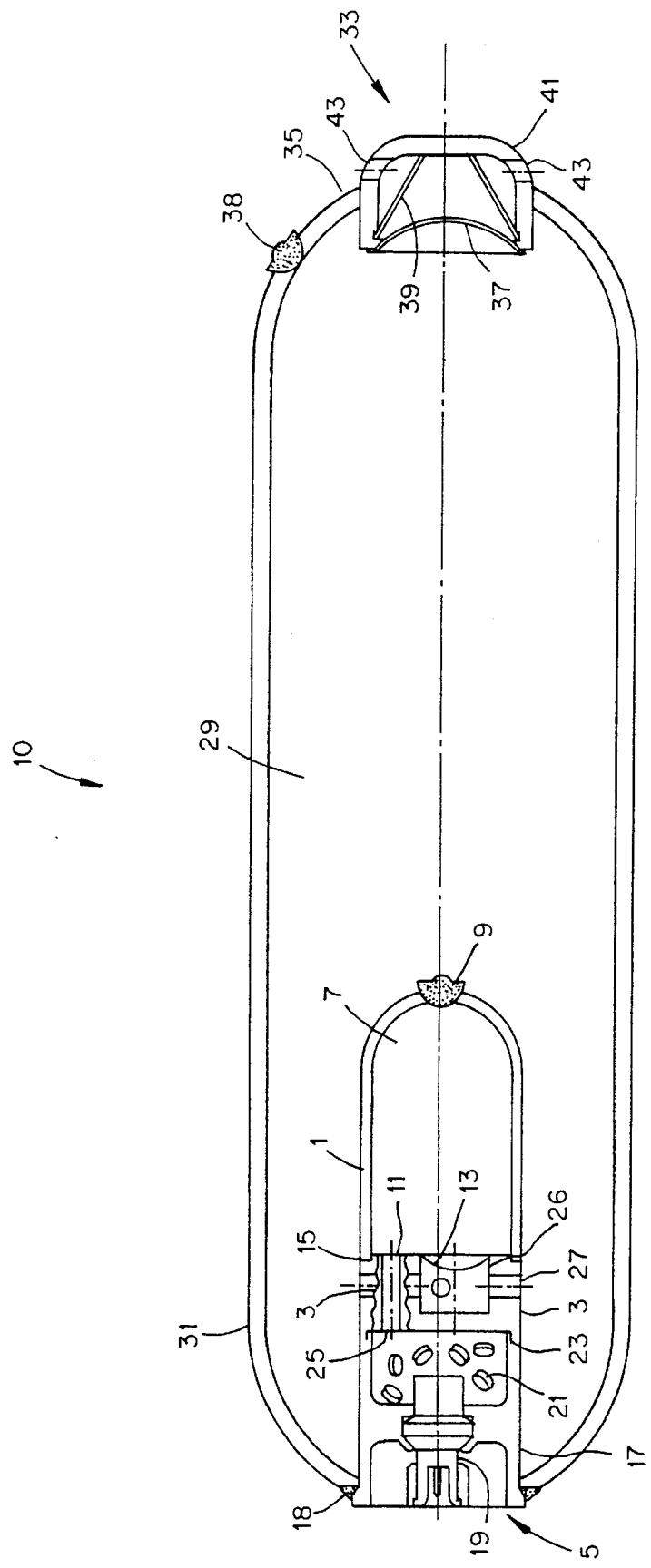

HYBRID INFLATOR FOR INFLATING AIR BAGS

FIELD OF THE INVENTION

The present invention is directed to a hybrid inflator for air bag inflation and, in particular, to a hybrid inflator which utilizes a gaseous fuel-containing pressure vessel.

BACKGROUND ART

The use of hybrid inflators for the inflation of air bags in automobiles is well known. Typically, a hybrid inflator includes a rupturable burst disk which releases a flow of gas from a pressure vessel in which the gas is stored to an air bag for inflation thereof. Rupture of the burst disk is responsive to a vehicle condition such as a collision.

In certain hybrid inflators, an igniter assembly is provided which, when actuated, ignites a body of pyrotechnic material. The ignited pyrotechnic material heats and pressurizes a stored inflator gas. The heated and pressurized stored inflator gas is then released for air bag inflation by rupture of the burst disk.

In the prior art, it has been proposed to use a gaseous hydrocarbon as part of the stored inflator gas. In U.S. Pat. No. 5,263,740, a hybrid air bag inflator is disclosed which includes a metal container having a sealed chamber. The sealed chamber contains a mixture of gases including an inert gas, a flammable fuel gas and an oxidizer gas. In conjunction with the metal container, an ignitable material is provided which is ignited by a squib. Ignition of the ignitable material releases the gases in the sealed chamber for combustion of the flammable fuel gas portion thereof for air bag inflation.

U.S. Pat. Nos. 5,350,192 to Blumenthal, 5,344,186 to Bergerson and 5,348,344 to Blumenthal et al. also disclose hybrid-type inflators utilizing a mixture of a fuel gas and other gases.

These types of hybrid inflators are not without their drawbacks. Since the gaseous hydrocarbon is combined with an inert gas and an oxidizer gas, it is difficult to realize uniform ignition of the combustible portion of the stored gas. In addition, these prior art inflators tend to be bulky in size and weight due to the presence of a manifold or plenum which receives the released stored gas prior to air bag inflation. These prior art devices also tend to be complex in design. In addition, solid particulate levels in the gas may be at unacceptable levels due to ineffective combustion.

In view of the drawbacks of these prior art hybrid inflators, a need has developed to provide an improved hybrid inflator which reduces solid particulate levels in the effluent gas when inflating air bags and also provides increased flexibility in inflator performance. In addition, a need has developed to provide inflator designs which are lighter in weight, simpler in design for weight savings when used in automobiles and lower in manufacturing costs.

In response to these needs, the present invention provides a hybrid inflator which utilizes a gaseous fuel in a first pressure vessel with a second pressure vessel storing a compressed inflator gas such as air, a mixture of argon and oxygen or mixtures thereof.

SUMMARY OF THE INVENTION

Accordingly, it is a first object of the present invention to provide an improved hybrid inflator for air bag inflation.

Another object of the present invention is to provide a method of inflating air bags.

A further object of the present invention is to provide a method of air bag inflation and a hybrid inflator which utilizes a first pressure vessel having a gaseous hydrocarbon fuel therein in conjunction with a second pressure vessel storing an inflator gas for air bag inflation.

Other objects and advantages of the present invention will become apparent as a description thereof proceeds.

In satisfaction of the foregoing objects and advantages, the present invention provides a hybrid inflator comprising a first pressure vessel having an inlet and an outlet, each of the inlet and outlet having a burst disk to seal an interior of the first pressure vessel which contains a gaseous fuel such as methane or hydrogen.

The hybrid inflator includes an igniter assembly having a propellant charge, the propellant charge being in communication with the inlet burst disk of the first pressure vessel.

A second pressure vessel is provided which contains a compressed inflator gas such as air or a mixture of argon and oxygen in the interior thereof. The interior of the second pressure vessel is in communication with the outlet burst disk of the first pressure vessel. The second pressure vessel includes a discharge assembly for releasing gases and products of combustion from the first and second pressure vessels for air bag inflation.

Preferably, the igniter assembly forms a part of the wall of the second pressure vessel and the first pressure vessel is positioned within the second pressure vessel. In this embodiment, the first pressure vessel can include a closure containing the inlet and outlet burst disk disks. The closure can also include passageways for communication between the inlet burst disk and the solid propellant of the igniter assembly and the outlet burst disk and the interior of the second pressure vessel.

According to the invention, a method of air bag inflation comprises the steps of providing a first gaseous fuel-filled pressure vessel and a second compressed inflator gas-containing pressure vessel. The gaseous fuel is first heated and pressurized above its autoignition temperature in the first pressure vessel by an initiator or squib. This fuel is then released from the first pressure vessel and discharged into the second pressure vessel when the first pressure vessel reaches a select temperature. Once released into the second pressure vessel, the unignited gaseous fuel is ignited. Ignition and release of the contents of the first pressure vessel heats and pressurizes the gases stored in the second pressure vessel. Upon reaching a select pressure, the gases in the second pressure vessel are released into an air bag for inflation thereof.

Preferably, the gaseous fuel is methane or hydrogen. The compressed inflator gas is preferably air, a mixture of argon and oxygen, or mixtures thereof.

In a preferred mode of the invention, the hybrid inflator uses a first pressure vessel for gaseous hydrocarbon fuel storage and a second pressure vessel for storing the inflator gases utilized for air bag inflation.

BRIEF DESCRIPTION OF THE DRAWING

Reference is now made to the sole drawing of the invention which depicts a cross-sectional view of a hybrid inflator according to the present invention.

DESCRIPTION OF THE PREFERRED EMBODIMENTS

A first embodiment of the inventive hybrid inflator is depicted in the sole drawing. The hybrid inflator is generally designated by the reference numeral 10 and includes a first pressure vessel 1 having an end closure 3 and an igniter assembly 5.

The pressure vessel 1 has an interior 7 filled with a compressed fuel gas such as methane or hydrogen, typically at 3000 psi. Of course, other pressures may be used ranging from as low as 500 psi up to 5000 psi. The pressure vessel 1 can also have a fill port 9 to facilitate introduction of the gaseous fuel into the vessel 1.

The end closure 3 seals the end of the vessel 1 opposite the fill port 9 to maintain the interior 7 in a pressurized state. The end closure 3 is secured to the sidewalls of the vessel 1 at weld 15. The end closure 3 has an inlet burst disk 11 and an outlet burst disk 13. These burst disks are designed to rupture at a given pressure as is well known in the prior art. Thus, a further description thereof is not deemed necessary for understanding of the invention. The function of the burst disks with regard to the other inflator components will be described below.

The igniter assembly 5 includes a housing 17, squib 19 and a propellant charge 21. The igniter assembly 5 is typical of igniters used in hybrid inflators. In use, the igniter assembly responds to a vehicle condition such as a collision and begins a sequence of steps to inflate an air bag.

The igniter assembly housing 17 is shown connected to the end closure at weld 23. The igniter assembly housing 17 forms part of a second pressure vessel 31 by virtue of the weld 18. The end closure 3 includes a passageway 25 which provides communication between the propellant charge 21 and the inlet burst disk 11. The end closure 3 also contains a manifold or plenum 26 which is in communication with the outlet burst disk 13. A series of outlet passageways 27 interconnects the manifold 26 with the interior 29 of the surrounding pressure vessel 31. The outlet passageways 27 can emanate from the manifold 26 in any configuration, e.g. radially or positioned at 90° segments.

The pressure vessel 31 stores an inflator gas such as compressed air, a mixture of an inert gas such as argon and an oxidizing gas such as oxygen, or other mixtures of an inert gas and an oxidizer.

The pressure vessel 31 includes a discharge assembly 33 secured to the vessel 31 at weld 35. The discharge assembly 33 includes a burst disk 37, a diffuser 39 and an outlet manifold 41 having discharge passageways 43. The discharge passageways 43 direct the expelled contents of the pressure vessels 1 and 31 into an air bag for inflation thereof. The pressure vessel 31 can also have a fill port 38 for filling of the pressure vessel 31 with the compressed inflator gas.

It should be understood that the embodiment depicted in the sole figure is a preferred embodiment only. That is, although the pressure vessel 31 surrounds the igniter assembly 5 and pressure vessel 1, other configurations can be employed wherein the outlet of the pressure vessel 1 communicates with the interior of the pressure vessel 31. Likewise, the end closure 3 of the pressure vessel 1 is exemplary and other configurations can be used providing communication is maintained between the solid propellant 21 of the igniter assembly and the inlet of the pressure vessel 1.

The compressed inflator gas is preferably at 3500 psi but can range between 500 and 5000 psi, depending on a desired inflator performance requirement.

The use of a gaseous fuel in a separate vessel allows precise control of the onset of the air bag inflation. The solid propellant 21, when ignited, ruptures the inlet burst disk and heats and pressurizes the gaseous fuel, e.g. methane, above its autoignition temperature. The hot gaseous fuel then ruptures the first pressure vessel outlet burst disk and is expelled into the compressed air pressure vessel wherein it reacts with the oxygen present in the compressed air. Combustion of the fuel at this stage in the process then raises the compressed air temperature and pressure. The pressure rise fails the rupture disk at the discharge assembly, thus allowing escaping gases to inflate a vehicle crash bag.

Any combustible fuel can be utilized in the inventive hybrid inflator, including hydrogen gas, methane or the like. Alternative compressed inflator gas mixtures can also be used such as a mixture of argon and oxygen or another inert gas and oxygen. Oxygen should be present in the compressed inflator gas to permit the gaseous hydrocarbon or other combustible fuel to combust when leaving the first pressure vessel.

The inventive hybrid inflator offers improvements over prior art designs by the use of a separate gaseous hydrocarbon filled pressure vessel. This feature reduces harzard and improves combustion. The inventive design also provides increased flexibility in inflator performance since different combinations of gaseous hydrocarbons and compressed inflator gases can be used depending on the desired inflator performance.

As such, an invention has been disclosed in terms of preferred embodiments thereof which fulfills each and every one of the objects of the present invention as set forth hereinabove and provides an improved hybrid inflator and method for inflating air bags.

Of course, various changes, modifications and alterations from the teachings of the present invention may be contemplated by those skilled in the art without departing from the intended spirit and scope thereof. Accordingly, it is intended that the present invention only be limited by the terms of the appended claims.

We claim:

1. A hybrid inflator comprising a first pressure vessel having an inlet, and an outlet, each of said inlet and outlet having a burst disk to seal an interior of said first pressure vessel containing a combustible fuel;

an igniter assembly having a propellant charge, said propellant charge in communication with the burst disk of said inlet;

a second pressure vessel containing a compressed gas, an interior thereof in communication with said burst disk of said outlet of said first pressure vessel, said second pressure vessel including a discharge assembly for releasing gases from said first and second pressure vessels for air bag inflation.

2. The hybrid inflator of claim 1, wherein said first pressure vessel is positioned within said second pressure vessel.

3. The hybrid inflator of claim 1, wherein said igniter assembly forms part of said second pressure vessel.

4. The hybrid inflator of claim 1, wherein said combustible fuel is methane or hydrogen.

5. The hybrid inflator of claim 1, wherein said first pressure vessel has a closure end containing each of the burst disks, said closure end including a first passageway providing communication between the solid propellant charge and the inlet burst disk and at least one second passageway providing communication between said second burst disk and the interior of said second pressure vessel.

6. The hybrid inflator of claim 5, wherein said at least one second passageway further comprises a plurality of second passageways.

7. The hybrid inflator of claim 5, wherein said closure end interconnects said igniter assembly and said first pressure vessel.

8. The hybrid inflator comprising:

a first combustible fuel-containing pressure vessel having a closure end having an inlet burst disk and an outlet burst disk;

said closure end including a first inlet passageway in communication with said inlet burst disk and at least one outlet passageway in communication with said outlet burst disk;

a second compressed gas-containing pressure vessel having a discharge assembly;

an igniter assembly forming a part of a wall of said second pressure vessel, said igniter assembly including a solid propellant in communication with said inlet burst disk.

9. The hybrid inflator of claim 1, wherein said compressed gas is air, a mixture of an inert gas and oxygen or mixtures thereof.

10. A method of inflating an air bag comprising the steps of:

providing a propellant charge;

providing a first combustible gas-filled pressure vessel;

providing a second compressed oxidizing gas-containing pressure vessel;

igniting the propellant charge, ignition thereof heating and pressurizing at least a portion of said combustible gas above an auto ignition temperature thereof in said first pressure vessel;

releasing said heated and pressurized combustible gas from said first pressure vessel when said first pressure vessel reaches a select pressure into said second pressure vessel to ignite said combustible gas with oxygen in the compressed oxidizing gas; and releasing gases in said second pressure vessel when said gases reach a select pressure into an air bag for inflation thereof.

11. The method of claim 10, wherein said combustible fuel is methane or hydrogen.

12. The method of claim 10, wherein said compressed gas is air, a mixture of an inert gas and oxygen or mixtures thereof.

13. A method of:

providing a propellant charge;

providing a first combustible gas-filled pressure vessel;

providing a second compressed oxidizing gas-containing pressure vessel;

igniting the propellant charge, ignition thereof heating and pressurizing at least a portion of said combustible gas above an auto ignition temperature thereof in said first pressure vessel;

releasing said heated and pressurized combustible gas from said first pressure vessel when said first pressure vessel reaches a select pressure into said second pressure vessel to ignite said combustible gas with oxygen in the compressed oxidizing gas; and releasing gases in said second pressure vessel when said gases reach a select pressure into an air bag for inflation thereof;

wherein said providing steps further comprises providing:

said first pressure vessel with an inlet and an outlet, each of said inlet and outlet having a burst disk to seal an interior of said first pressure vessel for containing said combustible gas;

an igniter assembly having a propellant charge, said propellant charge in communication with the burst disk of said inlet for performing said heating and pressurizing of said combustible gas above its auto ignition temperature;

the second pressure vessel with an interior thereof in communication with said burst disk of said outlet of said first pressure vessel, said burst disk of said outlet releasing said combustible fuel into said second pressure vessel for combustion of said combustible gas, said second pressure vessel including a discharge assembly for performing said releasing of gases from said first and second pressure vessels for air bag inflation.

* * * * *